Aug. 22, 1944. B. A. SOMERS 2,356,186
ISOLATION AMPLIFIER FOR SELF-SYNCHRONOUS SYSTEMS
Filed Aug. 7, 1942 3 Sheets-Sheet 3

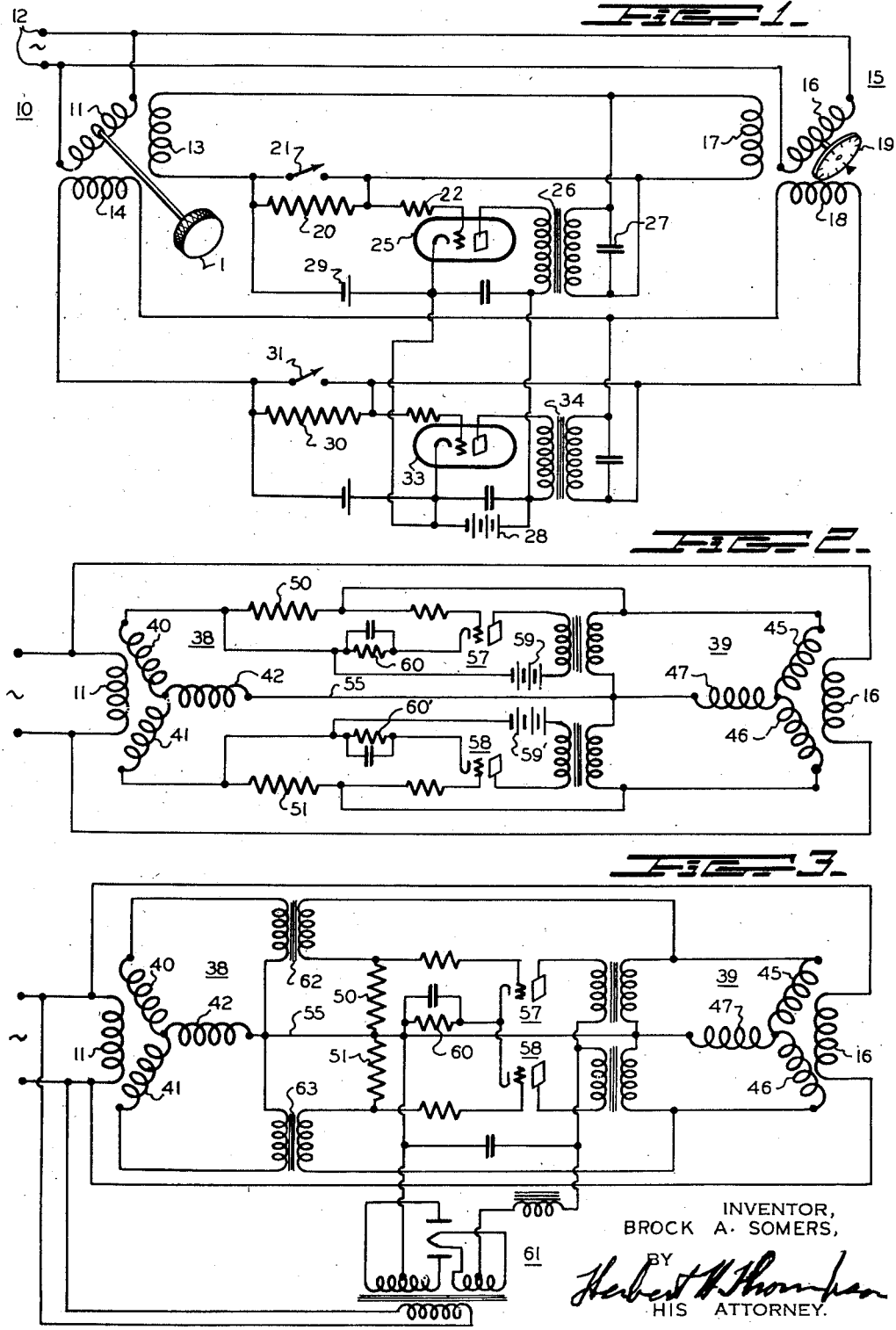

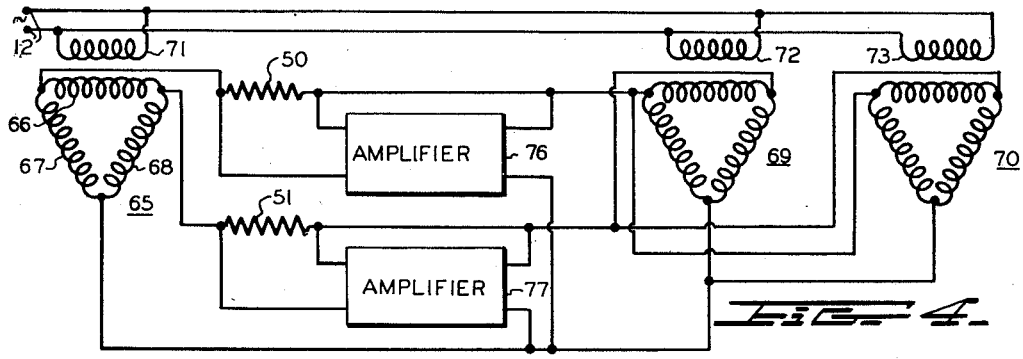
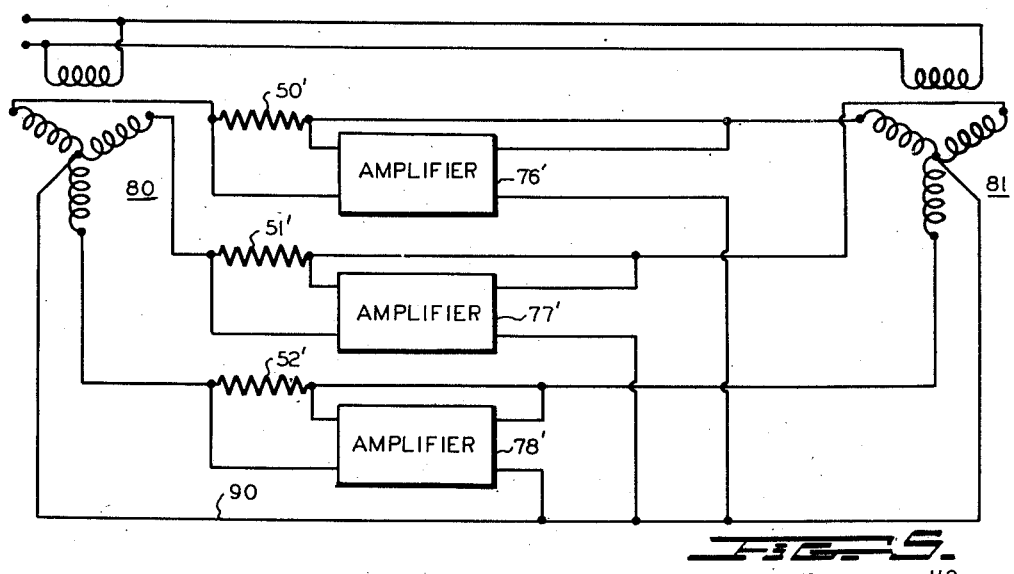
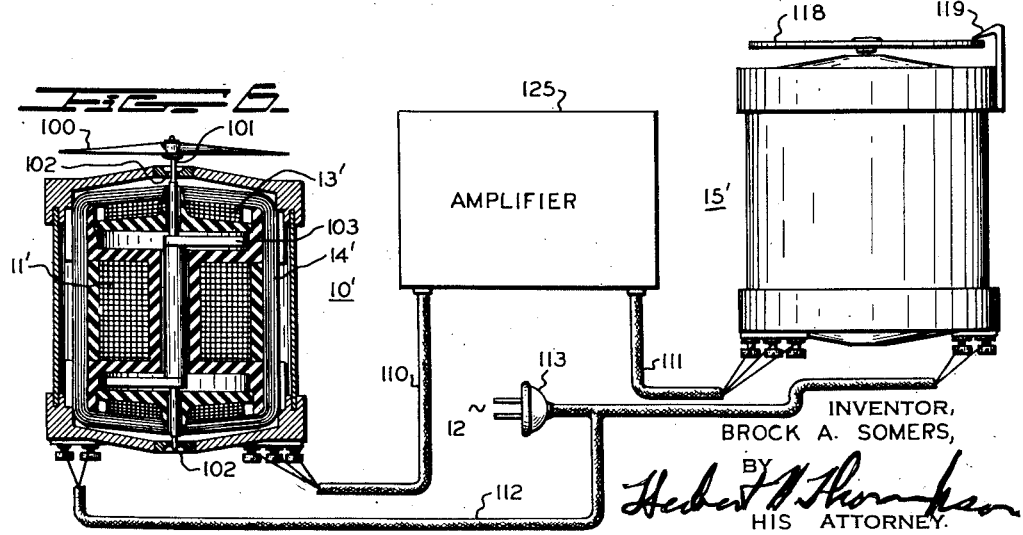

INVENTOR,
BROCK A. SOMERS,
BY
Herbert H. Thompson
HIS ATTORNEY

Patented Aug. 22, 1944

2,356,186

UNITED STATES PATENT OFFICE 2,356,186

ISOLATION AMPLIFIER FOR SELF-SYNCHRONOUS SYSTEMS

Brock A. Somers, Garden City, N. Y., assignor to Sperry Gyroscope Company, Inc., Brooklyn, N. Y., a corporation of New York Application August 7, 1942, Serial No. 454,072

20 Claims. (Cl. 172—239)

This invention relates to self-synchronous transmission systems and it refers, more particularly, to arrangements for preventing coercion and loading of the transmitter in such a system.

Self-synchronous transmission systems are widely used to repeat instrument readings and other data at locations remote from the source, and in their usual form comprise similar transmitting and receiving instruments each having a stator and a positionable rotor. One of these members in each instrument mounts a poly-circuit winding comprising a plurality of coils having angularly spaced magnetic axes and the other member mounts or is excited by a single-circuit winding. The transmitter and receiver poly-circuit windings are connected, coil for coil, and the single-circuit winding of both instruments are connected to a common source of alternating potential. The receiver rotor, if free to move, is caused by the interaction of the fields of the receiver poly-circuit and single-circuit windings to take up a position corresponding to the angular position of the transmitter rotor and follows any displacement of the transmitter rotor under the influence of the primary actuating instrument or member.

However, should the receiver (or any of them if a plurality of receivers are connected to a single transmitter) be restrained by friction or other forces from taking up the synchronous position, in the usual type of self-synchronous system the transmitter rotor experiences a reaction in the form of a torque tending to cause alignment with the receiver rotor.

This is a serious disadvantage especially when the indication of a sensitive instrument such as a magnetic compass is to be repeated, since in such cases the instrument opposes only a very weak directive force to the reaction on the transmitter rotor and consequently all indications, including that of the primary instrument, are rendered false.

Another disadvantage of the type of self-synchronous transmission system employed heretofore is the loading of the transmitter by the receiver or receivers. The accuracy of indication in a self-synchronous system depends upon the slope of the receiver torque-displacement curve in the region adjacent the synchronous position of the rotor. The steepness of this curve in turn depends, among other factors, upon the current in the poly-circuit receiver winding, the greater the current the steeper the curve and the greater the accuracy. This current, however, must be supplied by the transmitter and not only is this a drain upon the transmitter, but the losses in the transmission line connecting the transmitter and receiver increase rapidly with increase of current. The disadvantages of loading are multiplied when a plurality of receivers are operated from a single transmitter, because of coupling between the receiver circuits.

The proposed arrangement overcomes the disadvantages of the conventional type of self-synchronous system by providing an amplifier or amplifiers and associated circuits which maintain the voltages across corresponding coils of the transmitter and receiver poly-circuit windings equal at all times. Under these conditions a non-sychronous position of a receiver rotor cannot react on the transmitter, and a relatively large amount of current may be drawn by the receiver coils without correspondingly loading the transmitter.

I am aware that it has been proposed to compare voltages of corresponding transmitter and receiver windings by transformer means and to introduce a voltage compensating for differences therebetween. However, such prior arrangements have the disadvantages of the loading and distorting effects of the exciting currents of the compensating transformers as well as that of complication, and in addition require an amplifying element to be associated with each conductor of the transmitter-receiver line.

According to my improved arrangement, a very simple circuit is used in which the drop across an impedance, preferably a resistance, connected in the transmission circuit, which in the synchronous condition of the system absorbs no energy, is utilized as a criterion of equality between transmitter and receiver voltages and controls the power delivered by the amplifier to the receiver. By the use of such an arrangement I may, in certain modifications of the invention, dispense with the amplifying element otherwise associated with one of the conductors of the transmitter-receiver transmission line, as will be described. It is therefore, one object of the invention to provide in a self-synchronous transmission sytem means for preventing coercion of the transmitter by the receiver or receivers.

It is another object to provide means in such a transmission system for overcoming the disadvantageous effects of a plurality of receivers operated from a single transmitter.

Another object is to provide means for securing equality between the voltages of corresponding transmitter and receiver windings.

Another object is to provide means for comparing voltages across corresponding transmitter and receiver elements, which consumes no power in a synchronous condition of the system.

Another object is to provide amplifier means for a self-synchronous transmission system having fewer amplifying elements than the conductors of the transmission line connecting the transmitter and receiver or receivers of said system.

Another object is to provide an amplifier for a self-synchronous transmission system controlled by a series impedance in the transmitter-receiver line, which may be short-circuited for emergency operation.

Another object is to associate an implifier with a system of the above type in a manner such that the accuracy of the system is not dependent on the characteristics of the amplifying elements.

It is a further object to provide means for supplying current for steepening the torque-displacement curve of a receiver operating in a self-synchronous transmission system without drain upon the transmitter.

Other objects and advantages of the invention will become apparent as the description proceeds.

In the drawings,

Fig. 1 is a wiring diagram of a self-synchronous transmission system according to the invention, comprising a transmitter and a receiver, each having independent poly-circuit coils.

Fig. 2 is a wiring diagram of a similar system comprising a transmitter and a receiver having three-coil poly-circuit windings connected in a Y circuit and two amplifiers having independent plate supplies.

Fig. 3 is a wiring diagram of a system similar to Fig. 2, having two amplifiers supplied from a common rectifier.

Fig. 4 is a wiring diagram of a system comprising three coil transmitter and receiver poly-circuit windings connected in a delta circuit, and illustrating the employment of a plurality of receivers.

Fig. 5 is a wiring diagram of a system comprising three-coil transmitter and receiver poly-circuit windings connected in Y with interconnected neutral points.

Fig. 6 is a diagrammatic illustration of a self-synchronous transmission system according to the invention, for transmitting the indications of a magnetic compass, in which certain elements are shown in section.

Figure 7:
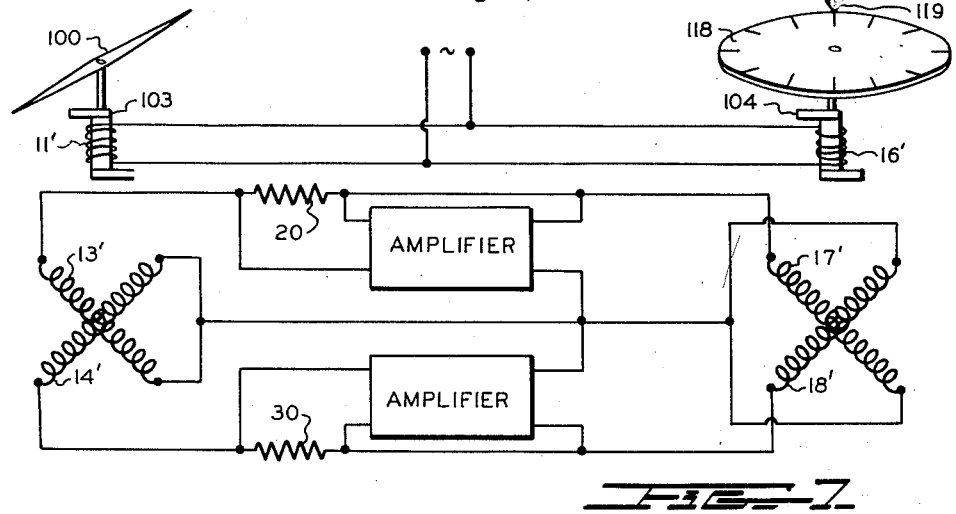
Fig. 7 is a wiring diagram of the system of Fig. 6.

Referring now particularly to Fig. 1, reference numeral 10 is applied to a self-synchronous transmitter having an exciting coil 11 supplied from an alternating current source 12, and a pair of independent poly-circuit or output coils 13 and 14. Exciting coil 11 is mounted on the rotatable member of the device in this case, which member is shown as positioned by knob 1, by way of illustration, it being understood that any rotatable member may position coil 11. An alternating magnetic field is produced by coil 11, which is rotatable in the plane determined by the axes of stator coils 13 and 14. A modified construction of a transmitter in which the exciting coil is stationary and an inductor member rotates the magnetic field is shown in detail in Fig. 5 and will be described hereinafter.

In Fig. 1, output coils 13 and 14 are shown as being independent, although in practice they may have a common connection if certain precautions regarding supply voltages are observed. A receiver 15, which may be similar in construction to transmitter 10, has a rotor mounting a coil 16 excited from source 12 and a stator mounting poly-circuit coils 17 and 18 connected to transmitter coils 13 and 14 respectively. The rotor may position an indicator 19, such as a dial readable on a stationary index. Interposed in the transmission line connecting coils 13 and 17 is a resistance 20 which can be short-circuited by a switch 21. Resistance 20 is also included, in series with a limiting resistance 22, in the grid circuit of an amplifying vacuum tube 25, which may be of any suitable conventional type. Plate battery 28 and grid battery 29 are shown, but heater circuits are omitted for simplicity of illustration. The output of tube 25 is applied by way of transformer 26, in parallel with receiver coil 17, that is, across the line on the receiver side of resistance 20. A condenser 27 may be shunted across secondary transformer 26 to improve operation.

In the circuit connecting transmitter coil 14 and receiver coil 18 similar amplifying means are inserted, actuated by the potential drop across series resistor 30, which also can be short-circuited by a switch 31 and which is included in the grid circuit of vacuum tube 33, whose output is applied by way of transformer 34 across coil 18.

In operation, if the voltages across coils 13 and 17 differ there will be a circulating current between them causing a potential drop in resistance 20, and this potential being applied to the grid of tube 25, an amplified version will appear across coil 17, which by proper connections may be phased to equate the potential across said coil with the potential across coil 13. When the field of receiver rotor coil 16 bears the same angular relationship to the fields of stator coils 17 and 18 that the field of transmitter coil 11 bears to the fields of coils 13 and 14, that is when positional synchronism is established, no current flows in resistances 20 and 30. At positions adjacent the synchronous position of rotor coil 16, large currents may, by suitable adjustment of the amplifier, be caused to flow in receiver coils 17 and 18 without imposing a corresponding drain on the transmitter, thus improving the torque characteristic of the receiver and the accuracy of the system.

If the receiver rotor is held by friction or other means, no reaction on the transmitter rotor occurs, since there is no change in the voltages across coils 13 and 14. Furthermore, because of the balanced transmitter and receiver coil voltages, the accuracy of the system is independent of the characteristics of circuit elements, including amplifying tubes, and of the supply voltages at the transmitting and receiving ends which, for efficient operation, must be equal in prior systems.

By the closing of switches 21 and 31, the system is readily converted to one of the usual type for emergency operation in case of amplifier failure or for test purposes.

Fig. 2 shows a system similar to that of Fig. 1 except that the transmitter 38 and receiver 39 in this case are illustrated as having poly-circuit windings comprising three Y-connected coils. In this arrangement, transmitter exciting coil 11 is again assumed to be mounted on the rotor (the positioning means not being shown) and to induce in stator coils 40, 41 and 42 alternating voltages proportional to the three components of the field of coil 11 in the directions of the respective axes of coils 40, 41 and 42. Receiver coils 45, 46 and 47 are connected to transmitter coils 40, 41 and 42, respectively, and in the line connecting coils 40 and 45 compensating resistance 50 is inserted, while in the line connecting coils 41 and 46 a similar resistance 51 is inserted. No resistance is inserted in the line 55 connecting coils 42 and 47. Resistance 50 is included in the input circuit of vacuum tube 57, while resistance 51 is included in the input circuit of vacuum tube 58. These tubes are shown as having independent plate supplies in the form of batteries 59, and 59', respectively, and independent self-biasing resistors 60 and 60', respectively.

In the operation of this modification of the invention, the component voltages induced by coil 11 in coils 40 and 42, in series, is compared with the combined voltages across coils 46 and 47. Any difference between these two voltages results in circulating current which causes a potential drop across resistance 50 and thereby applies a voltage across coils 46 and 47, in series, as an output from amplifier 57. Similarly, the voltage across coils 41 and 42, in series, is compared with that across coils 46 and 47 and compensation for any difference therebetween effected by the output of amplifier 58 resulting from the potential drop across resistance 51. If desired, amplifying elements 57 and 58 may be combined in a single dual tube of known construction.

Fig. 3 illustrates the use of a common plate supply for a system of the type of that of Fig. 2. This plate supply is shown as full-wave rectifier 61 of conventional design, supplied from the common A. C. supply. A single self-biasing resistance 60 is used to provide grid bias for both tubes. A pair of isolation transformers 62 and 63 is provided, having primary windings connected across transmitter coils 40, 42 and 41, 42, respectively. The secondary of transformer 62 supplies current to receiver coils 45, 47 by a path including compensating resistance 50. Similarly, the secondary of transformer 63 supplies current to receiver coils 46, 47 by a path including resistance 51. Resistances 50 and 51 supply inputs to amplifying tubes 57 and 58, respectively, as before. The operation of this modification will be apparent from the described operation of the arrangement of Fig. 2.

Fig. 4 illustrates an arrangement in which a plurality of receivers is actuated from a single transmitter. In the arrangement illustrated in this figure, the poly-circuit windings of the transmitter and the receivers are shown as being connected in delta instead of in Y as in Fig. 2. Thus transmitter 65 has as its stator winding coils 66, 67 and 68 connected in delta, while receivers 69 and 70 have similarly connected stators. In the case of each instrument, the rotor is excited by alternating current source 12, the transmitter rotor mounting winding 71 and the two receiver rotors mounting windings 72 and 73, respectively. Corresponding windings of receivers 69 and 70 are connected in parallel and these parallel windings are connected to the corresponding winding of transmitter 65, in series with a compensating resistance, as 50, 51. The drop across resistance 50 applies an input to amplifier 76, while amplifier 77 is controlled by the drop across resistance 51. Amplifiers 76 and 77 may be similar to any of the amplifiers described hereinbefore. The operation of the circuit in Fig. 4 will be apparent due to its general similarity to circuits previously described.

Fig. 5 illustrates still another modification in which the transmitter and receiver poly-circuit windings are Y connected and the neutral points of the two Y's are connected. Thus the transmitter 80 is shown as connected to receiver 81 with compensating resistances 50', 51' and 52' connected in the conductors joining similar points in the transmitter and receiver. Resistances 50', 51' and 52' apply inputs to amplifiers 76', 77' and 78', respectively. The output of each amplifier is connected across only one coil of the Y-connected receiver stator winding instead of two coils, as in Figs. 2 and 3. It will be apparent that in operation the transmitter and receiver voltages compared are those between the neutrals of the two Y networks and the points of the Y's. Otherwise the compensation is applied as has been described hereinbefore.

In Fig. 6 the invention is shown as applied to a system for the remote indication of a magnetic compass. Compass needle 100 is shown as connected to actuate a transmitter 10' by being mounted on a shaft 101 thereof rotatable in anti-friction bearings 102, which also mounts a Z-shaped inductor member of magnetically permeable material 103. This type of transmitter, which avoids the rotation of a coil (as in Fig. 1) to which connection must be made by slip rings and brushes, is generally known as a "Telegon" transmitter. Exciting coil 11' is positioned to be coaxial with inductor 103, while pick-up coils 13' and 14' are positioned with their axes perpendicular to one another and both perpendicular to the axis of coil 11'. The output of transmitter 10' is transmitted to receiver 15' over a circuit including cable 110, amplifier 125 and cable 111. Amplifier 125 may comprise circuit arrangements as shown in Fig. 1, including amplifying tubes 25 and 33 and compensating resistances 20 and 30. Excitation for transmitter 10' and receiver 15' is by way of cable 112 which includes plug 113 for making connection to alternating current source 12.

Receiver 15' is also of the "Telegon" type in which the rotatable inductor is positioned by the stator field in accordance with the position of the transmitter inductor. In neither transmitter nor receiver is there any contact between the exciting coil and the inductor, the latter serving to turn the exciting field into a plane at right angles to the axis of the exciting winding and to rotate that field in the plane. Such an arrangement, by reducing frictional forces, is well adapted to transmit the indication of a magnetic compass or other instrument having a weak directive force, and by the isolating and compensating arrangements of the present invention, the further advantage of the elimination of coercion and loading is obtained.

The wiring diagram of Fig. 7 shows the connections of the system of Fig. 6 and is similar to Fig. 1 except that transmitter coils 13' and 14', corresponding to coils 13 and 14, are joined and are connected by a three-conductor line to receiver coils 17' and 18', which also have a common point.

Figure 8:
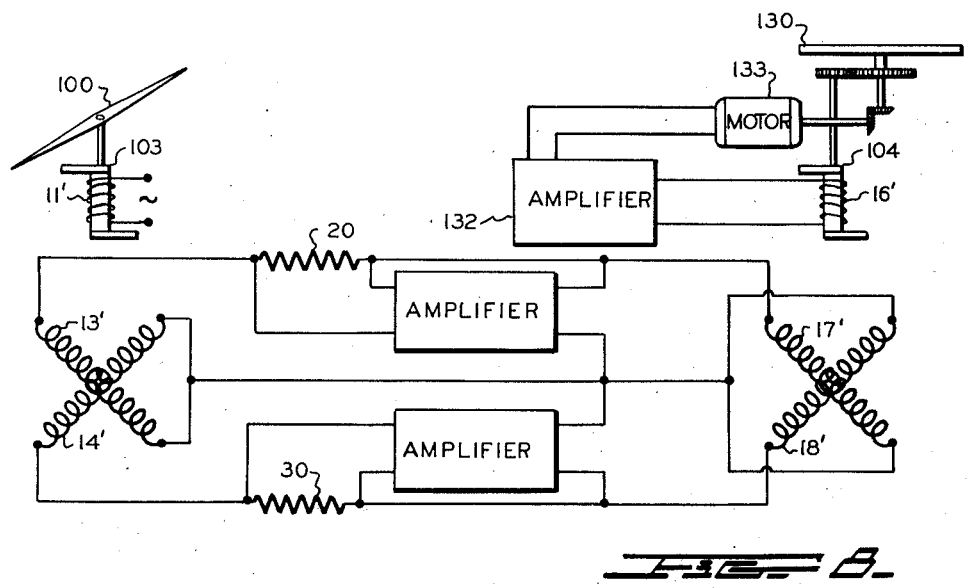
Fig. 8 is a wiring diagram of a system employing servo means to position a heavy object.

In Fig. 8 there is illustrated an application of the invention to a system for positioning a heavy object in accordance with the position of a sensitive member, such as compass needle 100. In this modification, receiver inductor 104 (or a rotor directly mounting an output coil) instead of being freely rotatable, is driven from the positioned object, shown as platform 130. Under this condition a voltage is induced in output coil 16' which is dependent on the relation of the angular positions of inductors 103 and 104. This voltage or positional signal is applied to phase sensitive amplifier 132, of conventional design, the output of which causes motor 133 to drive platform 130 to a position corresponding to the position of needle 100. The receiver in this case is known as a signal generator or synchro transformer.

A signal generator, when used in circuits similar to those of the usual type of self-synchronous system, is peculiarly apt to exert some coercion on the transmitter because of the relationship of the magnetic axis of the single circuit winding (or the inductor excited by said winding) to the direction of the field of the poly-circuit winding, which for zero output is a perpendicular one. The present system, by eliminating coercion, enables a very sensitive instrument to be utilized as the controlling element of a positional control system comprising a signal generator.

In addition to the trade name "Telegon," applied to instruments of a particular construction, self-synchronous transmitters and receivers are widely known as "Selsyn" instruments and the term "Selsyn" type instruments is commonly used in a generic sense as characterizing self-synchronous instruments.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a remote indicating system, a transmitter having a rotor and means for producing electrical potentials in accordance with the position of said rotor, a receiver, a transmission line for supplying said potentials to said receiver, a lumped impedance in said line, and an amplifier having an input derived from the potential drop across said impedance and supplying potentials to said receiver jointly with said transmitter.

2. In a remote positioning system, a transmitter having a rotor and means for producing electrical potentials in accordance with the position of said rotor, a receiver, a multi-conductor transmission line operatively connecting said transmitter and receiver for the transmission of currents proportional to said potentials, an impedance connected in a conductor of said line, an amplifier having an input derived from the potential drop across said impedance and supplying an output to said receiver, and means positioned by said receiver.

3. The combination as claimed in claim 1, including means for selectively short-circuiting said impedance.

4. In a self-synchronous transmission system, a transmitter having a rotor and means for producing a plurality of potentials relatively variable in accordance with the position of said rotor, a receiver, a multi-conductor transmission line connected to apply said potentials to said receiver, said receiver having a rotor positioned in accordance with the relative values of the applied potentials, a series impedance in a conductor of said line, and an amplifier controlled by the potential drop across said impedance and supplying an output across a pair of conductors of said line, including the conductor having said impedance connected therein, on the receiver side of said impedance.

5. In a synchronous positional control system, a transmitter, positionable means connected to actuate said transmitter to produce electrical potentials in accordance with the position of said means, a receiver adapted to operate in synchronism with said transmitter, means connecting said transmitter and receiver for synchronous operation including a transmission line, and means positionally controlled by said receiver in correspondence with said first positionable means, said connecting means further including an amplifier furnishing an auxiliary input to said receiver in proportion to the potential drop across an impedance element of said line.

6. In a self-synchronous transmission system, a network including interconnected self-synchronous transmitter and receiver means, means for detecting interchange of current between said transmitter and receiver means, and an amplifier controlled by said last means and supplying an output to said network in accordance with said interchanged current.

7. In a self-synchronous transmission system, a transmitter and a receiver adapted to operate in synchronism, a multi-conductor line connecting said transmitter and receiver including a series resistance in a conductor of said line, and an amplifier controlled by the potential drop across said resistance for supplying an output potential across a pair of conductors of said line including the conductor having said resistance connected therein.

8. In a self-synchronous transmission circuit, a self-synchronous transmitter having more than two output terminals, a source of alternating potential, means for exciting said transmitter from said source, a self-synchronous receiver having input terminals equal in number to said transmitter terminals, a transmission line having conductors respectively connecting corresponding terminals of said transmitter and receiver, and independent means for detecting current flow along all but one of said conductors and for supplying compensating potentials to a suitable portion of the circuit to eliminate said flow.

9. In a self-synchronous transmission system, a source of alternating potential, a transmitter and a receiver excited from said source each having three line terminals, a transmission line having conductors connecting corresponding line terminals of said two instruments, two, only, of said conductors including a lumped impedance serially connected in each, and a pair of amplifying means respectively receiving the potential drops across said impedances as inputs and each supplying an output to said line across a pair of conductors thereof which includes the conductor in which neither of said impedances is connected.

10. The combination as claimed in claim 9, including means for selectively short-circuiting said impedances.

11. In a self-synchronous transmission system, a source of alternating potential, a transmitter and a receiver each excited therefrom and each including a three-terminal network, a three-conductor transmission line connecting corresponding terminals of said networks, a series element connected in each of two, only, of said line conductors for producing a control potential responsive to current flow thereover, and individual amplifying means respectively controlled by said potentials for supplying additional inputs to said receiver.

12. The combination as claimed in claim 11, in which said three-terminal networks are Y connected.

13. The combination as claimed in claim 11, in which said three-terminal networks are delta connected.

14. In a self-synchronous transmission system, a source of alternating potential, a transmitter and a receiver adapted for synchronous operation, each excited from said source, said transmitter and receiver including similar poly-phase type networks, a poly-phase transmission line connecting said two networks, isolating transformers in all but one phase of said line, series impedance elements for obtaining measures of line currents on the receiver side of said transformers, amplifying means in each of said phases each controlled in accordance with one of said measures, and a common supply of plate potential for said amplifiers.

15. A pair of Y connected networks, a four-conductor transmission line connecting said networks including a connection between the neutral points of said networks, means for obtaining measures of line currents, and individual amplifier means having respective inputs in accordance with said measured currents and each supplying an output between the line furnishing the input thereto and the neutral.

16. In combination, a transmitter-receiver arrangement adapted for self-synchronous operation, including a connecting transmission line, said line having a series element receiving a potential due to current flow over said line, and an amplifier having an input derived from said potential and supplying an output to said receiver.

17. Non-reacting means for remotely repeating the indication of a sensitive indicating device, said means comprising a transmitter which may be actuated by such an indicator, a receiver connected to said transmitter by a transmission line, said transmitter and receiver being adapted for synchronous operation, connected means in said line for detecting current flow thereover, and an amplifier controlled by said last means in accordance with said current and having an output applied to said transmitter-receiver circuit in a manner adapted to reduce said current.

18. In a remote indicating system self-synchronous means including a transmitter, and a receiver of the self-synchronous type with exciting means therefor, means for preventing reaction on said transmitter comprising amplifying means supplying energy to said self-synchronous means independently of said exciting means, and means for controlling said amplifying means in accordance with the interchange of current between the transmitting and receiving portions of said self-synchronous means.

19. In a positional control system, a sensitive control device having a movable member, a controlled object possessing substantial inertia, means furnishing a measure of the positional disagreement of said object and member comprising a transmitter driven from said member and a connected signal generator driven from said object, said transmitter and generator being of the "Selsyn" type, driving means for said object controlled by and in accordance with said measured quantity, and means for preventing reaction on said device comprising amplifying means furnishing additional energy to said signal generator proportional to the current in the line connecting said transmitter and generator.

20. In a positional control system having a sensitive movable control device and a controlled object possessing substantial inertia, signal means furnishing a measure of the positional disagreement of said object and device comprising a transmitting generator and a connected signal generator, one generator being driven from said object and one from said device, said generators being of the self-synchronous type in which a signal is generated proportional to the disagreement in the positions of said device and object, driving means for said object controlled by and in accordance with said signal, and means for preventing reaction on said device comprising amplifying means furnishing additional energy to said signal generator proportional to the current in the line connecting said generators.

BROCK A. SOMERS.